United States Patent
Rufty et al.

(10) Patent No.: US 10,093,465 B2
(45) Date of Patent: Oct. 9, 2018

(54) ANTI-SLIP CABLE TIE

(71) Applicant: Thomas & Betts International LLC, Wilmington, DE (US)

(72) Inventors: Ryan M. Rufty, Memphis, TN (US); Andrew C. Cole, Southaven, MS (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 15/413,039

(22) Filed: Jan. 23, 2017

(65) Prior Publication Data

US 2017/0129669 A1  May 11, 2017

Related U.S. Application Data

(63) Continuation of application No. PCT/US2015/041503, filed on Jul. 22, 2015.
(Continued)

(51) Int. Cl.
*B65D 63/08* (2006.01)
*F16B 2/08* (2006.01)
(Continued)

(52) U.S. Cl.
CPC ............... *B65D 63/08* (2013.01); *F16B 2/08* (2013.01); *F16B 2/14* (2013.01); *F16B 2/16* (2013.01)

(58) Field of Classification Search
CPC ...... F16B 2/08; F16B 2/14; F16B 2/16; Y10T 24/1473; Y10T 24/3976; B65D 63/08
See application file for complete search history.

(56) References Cited

U.S. PATENT DOCUMENTS 6,122,804 A  9/2000 Gamaggio-Schäfer
6,647,596 B1  11/2003 Caveney
(Continued)

FOREIGN PATENT DOCUMENTS

CN  100352744 C  12/2007
CN  101589258 A  11/2009
(Continued)

OTHER PUBLICATIONS

International Search Report and Written Opinion, PCT/US2015/041503, Thomas & Betts International, LLC, Jul. 1, 2016, 12 pages.
(Continued)

*Primary Examiner* — Robert Sandy
(74) *Attorney, Agent, or Firm* — Taft Stettinius & Hollister LLP

(57) ABSTRACT

A cable tie includes a band that extends lengthwise from a first end to a second end. The cable tie also includes a housing, affixed near the second end, with a first opening to receive the first end of the band when the first end of the band is brought toward the housing in a loop. The housing includes: walls that enclose a space and have a stop toward the second end of the band; a first mass in the space; and a second mass placed in the space and between the first mass and the stop. When the first end is inserted into the housing, the first end passes under the first mass and the second mass and exerts a pull on the first mass toward the second mass. When the first mass is pulled toward the second mass, the second mass acts as a spring between the first mass and the stop and prevents the first mass from hitting the stop. After the first end is inserted into the housing and when the first end is being pulled out of the housing, due to a force exerted by the second mass to the first mass and the walls, the first mass squeezes the first end against the bottom of the housing and locks the first end in the housing.

19 Claims, 7 Drawing Sheets

Related U.S. Application Data

(60) Provisional application No. 62/027,448, filed on Jul. 22, 2014.

(51) Int. Cl.
  *F16B 2/14* (2006.01)
  *F16B 2/16* (2006.01)

(56) References Cited

U.S. PATENT DOCUMENTS

| | | | |
|---|---|---|---|
| 7,302,737 B2* | 12/2007 | Bae | B65D 63/06 24/115 L |
| 7,669,293 B2* | 3/2010 | Huang | F16L 3/2338 24/20 EE |
| 7,866,007 B2 | 1/2011 | DeBerry et al. | |
| 7,930,805 B2 | 4/2011 | Bulanda | |
| 9,254,949 B2* | 2/2016 | Dinh | H02G 3/32 |
| 9,834,352 B2* | 12/2017 | Freeman | F16B 2/16 |
| 9,884,708 B2* | 2/2018 | Cole | B65D 63/1027 |
| 2003/0204936 A1* | 11/2003 | Caveney | B65D 63/08 24/20 EE |
| 2004/0016085 A1 | 1/2004 | Caveney | |
| 2006/0200949 A1* | 9/2006 | Bae | B65D 63/06 24/20 R |
| 2013/0333164 A1 | 12/2013 | Dinh et al. | |
| 2016/0145019 A1* | 5/2016 | Freeman | B65D 63/08 |

FOREIGN PATENT DOCUMENTS

| | | |
|---|---|---|
| CN | 101415618 B | 11/2010 |
| CN | 1454824 A | 11/2013 |
| EP | 0758616 A1 | 2/1997 |
| EP | 2675028 A2 | 12/2013 |

OTHER PUBLICATIONS

SIPO, First Office Action (with English translation) issued in corresponding Chinese application No. 201580050955.0, dated Apr. 24, 2018, 22 pp.

* cited by examiner

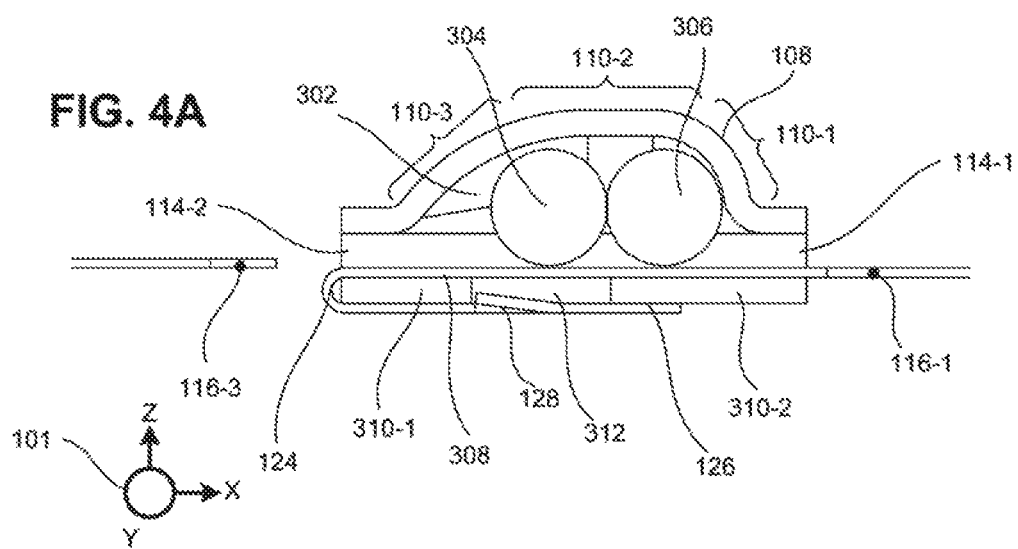
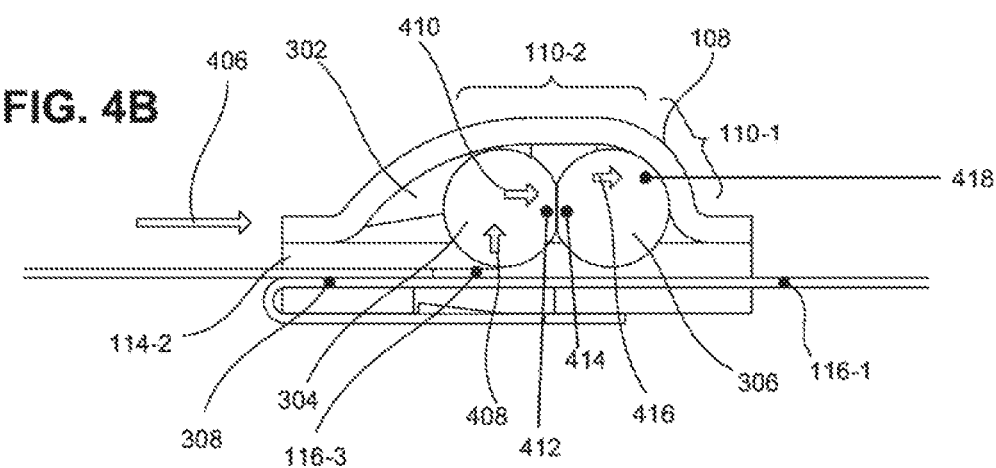
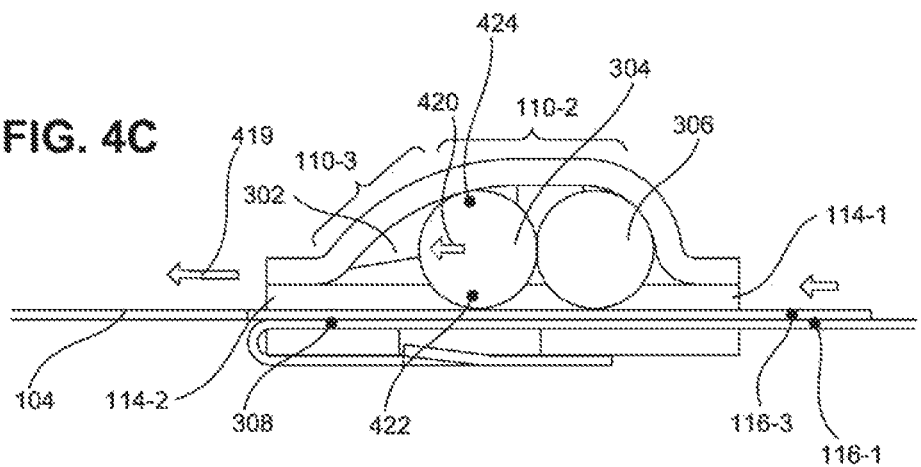

ANTI-SLIP CABLE TIE

BACKGROUND INFORMATION

A cable tie is used for fastening, binding, bundling, and/or organizing cables/wires. Different types of cable ties are made for use in different environments and applications. For example, some cable ties are made for outdoor use. Some cable ties are made for a specific industry, such as the food industry. Some are made for heavy-duty use (e.g., cable ties made of metal), for bundling large cables.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 4A is a cross-sectional side view of the cable tie before an end of the cable tie of FIG. 1A is inserted into a locking body of the cable tie;

FIG. 4B is a cross-sectional side view of the cable tie when the end of the cable tie of FIG. 1A is partially inserted into the locking body of the cable tie;

FIG. 4C is a cross-sectional side view of the cable tie after the end of the cable tie of FIG. 1A is partially inserted into the locking body and the cable tie is in the closed configuration;

DETAILED DESCRIPTION OF PREFERRED EMBODIMENTS

The following detailed description refers to the accompanying drawings. The same reference numbers in different drawings may identify the same or similar elements.

As described herein, an anti-slip cable tie provides for a small/minimum slack in binding, fastening or bundling cables. To tie/bundle cables using the anti-slip cable tie, one end of a band, of the cable tie, that encircles the cables is inserted into the housing of a locking body of the cable tie. When the end of the band is inserted within the housing of the locking body, the band pushes a ball bearing within the housing toward an inner wall of the housing. Another ball within the housing, however, prevents the ball bearing from moving backwards beyond a point and bumping into the inner wall. When the band is pulled/tugged in the forward direction away from the inner wall, the ball bearing, being close to a front of the wall, prevents the end of the band from slipping and locks the band in place. Because the other ball prevents the ball bearing from moving about in the housing, the ball bearing continues to lock the band in place.

Figure 1A:
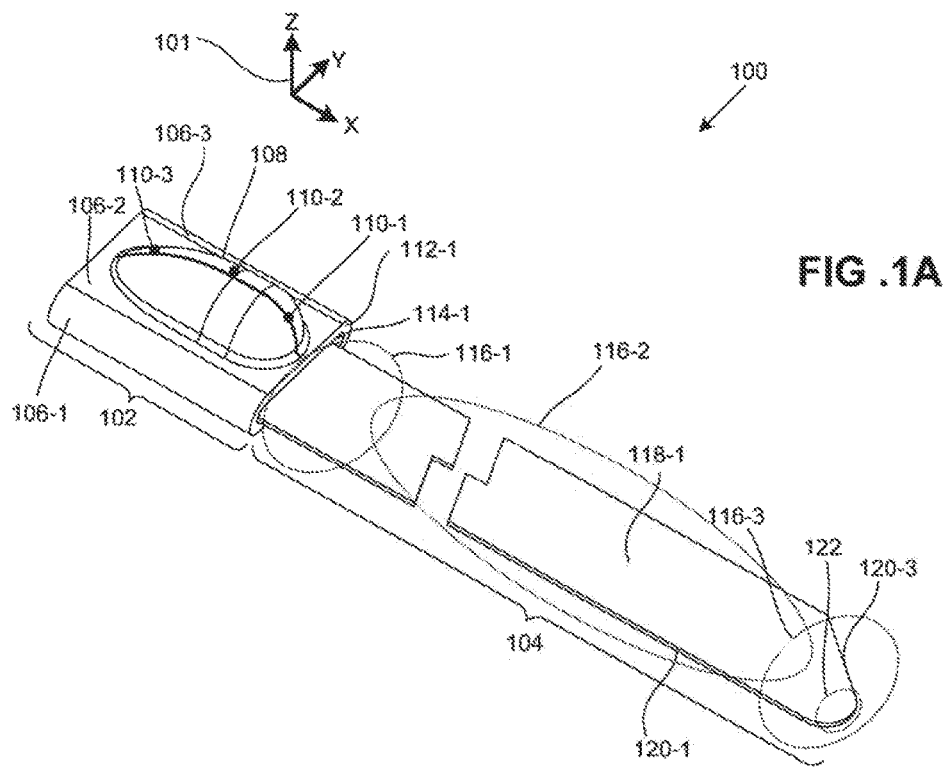
FIG. 1A is an isometric perspective top/side view of an exemplary cable tie in an open configuration according to one implementation.

FIG. 1A shows an isometric perspective top/side view of an exemplary cable tie 100 in an open configuration according to one implementation, together with an xyz-axes 101. As shown, cable tie 100 includes locking body 102 and a band 104. In FIG. 1A, cable tie 100 is oriented such that band 104 extends along the x-axis of xyz-axes 101 and the unit normal vector of the flat surface of band 104 is parallel to the z-axis. Band 104 has an interior portion inside of housing 108.

When band 104 is wrapped about cables and an end of band 104 (e.g., section 116-3) is inserted within locking body 102, locking body 102 prevents the end from slipping back out of locking body 102 and the band from unwrapping about the cables.

Locking body 102 includes a side wall 106-1, a top wall 106-2, a side wall 106-3, bottom walls 106-4 and 106-5 (shown in FIG. 1B), and housing 108. Walls 106-1 through 106-5 (collectively referred to as "walls 106") extend along the x-axis from a side face 112-1 to a side face 112-2 (shown in FIG. 1B). In one implementation, walls 106 may be made of one continuous strip of rigid material wrapped (e.g., loosely) about band 104, such that there is a gap/opening 114-1 and gap/opening 114-2 (FIG. 1B) between walls 106 and band 104.

Housing 108 includes a side portion 110-1 (also referred to as a "stop 1101-"), a top portion 110-2, and a side portion 110-3 (collectively referred to as "portions 110"). As further described below, portions 110 are configured/shaped to enclose and interact with elements within housing 108, to prevent a portion of band 104 (which was inserted through opening 114-1 and 114-2) from sliding out from housing 108 when anti-slip cable tie 100 is in the closed configuration. In FIG. 1A, housing 108 is in the shape of a dome, and may be made of steel, plastic, or another suitable material.

Band 104 includes an entrance section 116-1, a middle section 116-2, and an end section 116-3. Band 104 also includes a side edge 120-1, a front edge 120-2, and a side edge 120-3 (not shown). In one embodiment, side edge 120-1 and front edge 120-2 form an acute angle, such that, along the side edge 120-1 and parallel to the x-axis, the end of band 104 tapers to a tip 122 that can be more easily inserted into a gap/opening 114-2 (see FIG. 1B) after band 104 is bound around cables/wires, to result in a closed (loop) configuration. The end of tip 122 may be rounded, so that a user may not easily and accidentally puncture oneself with tip 122. In one embodiment, when band 104 binds/bundles cables/wires, bottom surface 118-2 (FIG. 1B) of band 104 may face the cables/wires and be in contact with the cables/wires. Band 104 may be made of flexible material, such as steel, or another material.

Figure 1B:
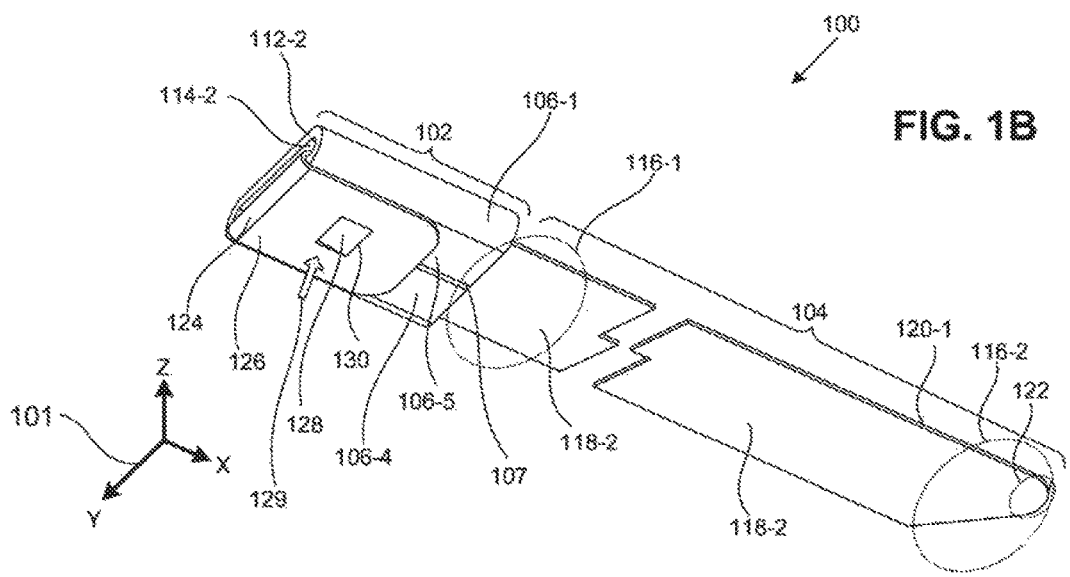
FIG. 1B is an isometric perspective bottom/side view of the cable tie of FIG. 1A in the open configuration.

FIG. 1B shows an isometric perspective bottom/side view of cable tie 100 in an open configuration, together with an xyz-axes 101. FIG. 1B illustrates a number of features, of cable tie 100, that are not shown in FIG. 1A. For example, FIG. 1B shows side edge 112-2 with gap/opening 114-2. FIG. 1B also shows band 104 extending from entrance portion 116-1 into locking body 102 (along the negative axis) and exiting from locking body 102 via opening 114-2 to form a clip 124 with a flap 126 that covers bottom walls 106-4 and 106-5 in the direction of the x-axis. As shown, clip 124 and flap 126 are integrally formed with band 104. In a different implementation, clip 124 and flap 126 may be constructed separately from band 104 and then affixed together via screws or another mechanism.

As shown in FIG. 1B, flap 126 includes, in one embodiment, at about the middle of its surface, a tab 128 with a crease 130. Bottom walls 106-4 and 106-5 above tab 128 has a hole (e.g., a square hole whose front edge is aligned with a front edge of tab 128) (not shown in FIG. 1B). Tab 128 is thrust upward in the direction of arrow 129 into the hole, bent about crease 130 (e.g., in the direction of the z-axis).

In this configuration, side walls 106-1 and 106-3 of locking body 102, clip 124, and tab 128 hold/affix a portion of locking body 102 to an interior portion of band 104, with the bottom surface 118-2 of band 104 being flush with an interior surface (the surface within locking body 102) of bottom walls 106-4 and 106-5 and the top surface of flap 126 being flush with the exterior surface (the surface in the z-direction) of bottom walls 106-4 and 106-5. Side walls 106-1 and 106-3 prevent the interior portion of band 104 from moving laterally in the negative/positive y-direction with respect to locking body 102. Clip 124, which is integral to band 124, prevents locking body 102 from sliding in the negative/positive x-direction relative to the interior portion of band 104. Tab 128, having been pushed into the hole in bottom walls 106-4 and 106-5, catches an edge of the hole when an external force is applied to locking body 102 relative to the interior portion of band 104 in the positive x-direction. Tab 128 and the hole prevents locking body 102 from sliding in the x-direction relative to the interior portion of band 104.

Figure 2:
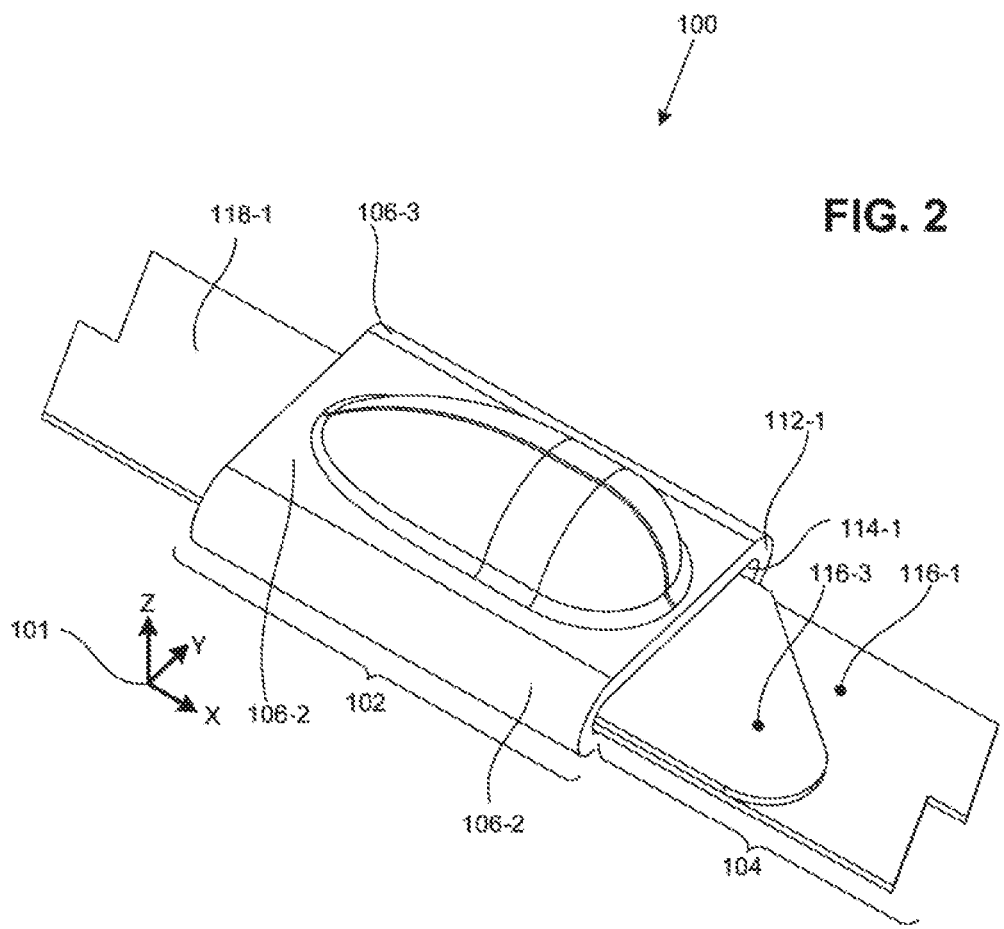
FIG. 2 is an expanded isometric perspective top/side view of the cable tie of FIG. 1A in the closed configuration.

FIG. 2 is an expanded isometric perspective top/side view of cable tie 100 in the closed configuration. In FIG. 2, end portion 116-3 of band 104 has been inserted into gap/hole 114-2 formed at side wall 112-2 of locking body 102, and passed through and out of locking body 102 via gap/hole 114-1, resulting in the closed configuration. In the configuration, a section/portion of band 104 (e.g., end section 116-3) overlaps with entrance portion 116-1 of band 104. In FIG. 2, bottom surface 118-2 of end section 116-3 would be in contact with the top surface 118-1 of entrance section 116-1.

Figure 3:
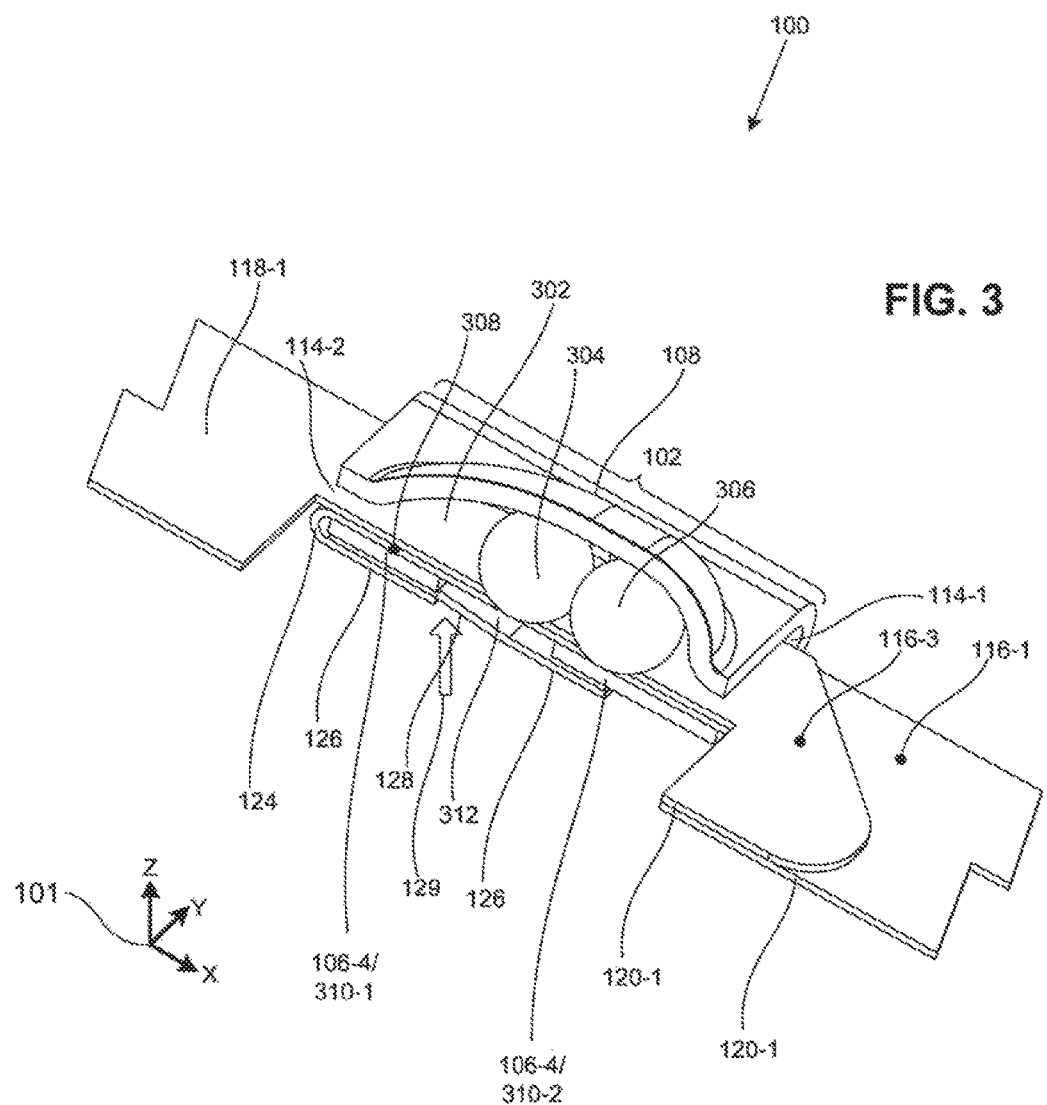
FIG. 3 is an isometric cut-away perspective top/side view of the cable tie of FIG. 1A in the closed configuration.

FIG. 3 is an isometric cut-away perspective top/side view of cable tie 100 in the closed configuration. FIG. 3 shows a number of features that are not visible in FIG. 1A through FIG. 2. As shown, housing 108 encloses space 302 in which a ball bearing 304 and sphere 306 are placed. In one implementation, ball bearing 304 may be made of metal (e.g., steel) and sphere 306 may be made of elastomeric or another material (e.g., plastic, rubber, sponge-like or spring-like material, stainless steel sponge, etc.). In the implementation illustrated in FIG. 3, ball bearing 304 and sphere 306 may have approximately the same diameter. In other implementations, the diameters may be different.

FIG. 3 also shows entrance portion 116-1 extending into housing 108 as an interior section/portion 308, which joins clip 124. In the closed configuration, interior section 308 is underneath end section 116-3 and above bottom walls 106-4 and 106-5. In FIG. 3, bottom wall 106-4 is illustrated as having front area 310-1 and a rear area 310-2. Between front area 310-1 and rear area 310-2 is a rectangular/square hole 312, into which tab 128 protrudes in the direction of arrow 129. As explained above, an edge of tab 128 engages an edge of square hole 312 if housing 108 is pushed/pulled in the x-direction relative to interior section 308, and prevents housing 108 from sliding in the x-direction relative to interior section 308 (e.g., prevents housing 108 from detaching from interior portion 308 of band 104).

FIGS. 4A through 4C are cross sectional side views of cable tie 100 at different stages of closing cable tie 100 into a loop. FIG. 4A is a cross sectional side view of cable tie 100 before end section 116-3 of band 104 is inserted into locking body 102 via gap/opening 114-2 to be in the closed configuration. Like FIG. 3, FIG. 4A shows ball bearing 304 and sphere 306 occupying space 302 of housing 108.

FIG. 4B is a cross sectional side view of cable tie 100 when end section 116-1 of band 104 is partially inserted into locking body 102 of cable tie 100. In FIG. 4B, after band 104 is wrapped about a bundle of cables/wires, end section 116-3 is pushed in the direction of arrow 406 via gap/opening 114-2 into housing 108. Consequently, end section 116-3 overlaps with interior section 308. As end section, 116-3 moves further in the direction of arrow 406, section 116-3 also pushes ball bearing 304, causing ball bearing 304 to move in the direction of arrow 408, such that section 116-3 may slide underneath ball bearing 304. In addition, section 116-3 also pushes ball bearing 304 in the direction of arrow 410, causing an area 412 on ball bearing 304 to contact an area 414 of sphere 306. Although the force on area 414 pushes sphere 416 in the direction of arrow 416, because area 418 of sphere 416 is in contact with stop 110-1 (or the interior surface of side portion 110-1) of housing 108, sphere 306 moves, in the direction of x-axis, little or no distance. Accordingly, sphere 306 prevents ball bearing 304 from moving further in the direction of arrow 410 and touching stop 110-1.

FIG. 4C is a cross sectional side view of cable tie 100 after end section 116-3 of band 104 is inserted into locking body 102 and cable tie 100 is in the closed configuration. In FIG. 4C, having been inserted fully into housing 108, end section 116-3 overlaps with entrance section 116-1. From this position, if band 104 is pulled in the direction of arrow 419, the frictional force between band 104 and ball bearing 304 causes ball bearing 304 to move in the direction of arrow 420 to the extent that there is space/clearance in space 302. Because space 302 within housing 108 is tapered in the negative x-direction, as ball bearing 304 is driven in the direction of arrow 420 until ball contacts the surface of portion 110-3 (also referred to as "stop 110-3"), area 424 and 422 of ball bearing 304 exert increasing force on the interior surface of portion 110-3 of housing 108 and on the top surface of end section 116-3 of band 104, respectively. The downward force exerted by area 422 of ball bearing 304 on end section 116-3 may pinch end section 116-3 between ball bearing 304 and interior section 308, and thus prevent end section 116-3 from retreating back in the direction of arrow 410 through gap/opening 114-2. That is, ball bearing 304 provides for the locking mechanism of cable tie 100.

As briefly discussed above, in a different embodiment without sphere 306 in space 302, when end section 116-3 is inserted into housing 108, end section 116-3 may cause ball bearing 304 to move all the way (or significant portion of the way) to stop 110-1 of housing 108. With ball bearing 304 in such a position, if band 104 were pulled back in the direction of arrow 419 (e.g., due to the weight of cables that are bound by cable tie 100), as end section 116-3 moves in the same direction relative to housing 108, ball bearing 304 would also move from the stop 110-1 of housing 108 toward the interior surface of portion 110-3 of housing 108, until ball bearing 304 locks end section 116-3, and, therefore, band 104. The distance covered by ball bearing 304 until ball bearing 304 locks band 104 is approximately the amount of slippage of band 104 allowed by cable tie 100. The slippage may result in an undesirable amount of slack in band 104 when cable tie 100 is in the closed configuration, with band 104 wrapped about cables/wires.

In contrast, with sphere 306 in place as illustrated in FIGS. 3, 4A, 4B, and 4C, ball bearing 304 cannot move in the direction of arrow 410 when end section 116-3 is inserted into housing 108 (or can only move a small amount). Hence, when band 104 is pulled in the direction of arrow 419 (e.g., by the weight of the cables that are wrapped by band 104), ball bearing 304 cannot travel a significant distance until ball bearing 304 locks band 104. In other words, sphere 306 prevents band 104 from slipping, and thus creating slack between band 104 and the cables bundled by cable tie 100 (e.g., slipping distance<the distance occupied by sphere 306 (e.g., the diameter)).

Figure 5A:
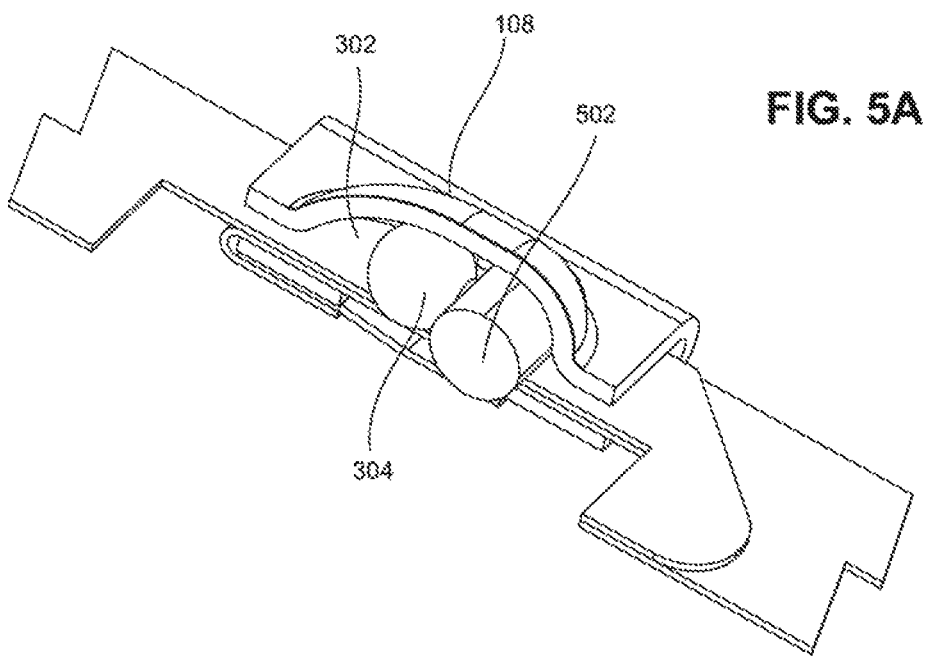
FIG. 5A is an isometric cut-away perspective top/side view of the cable tie according to another implementation.

FIG. 5A is an isometric cut-away perspective top/side view of cable tie 100 according to another implementation. In this implementation, cable tie 100 includes, in the place of sphere 306, a cylinder 502. Cylinder 502 may play a role similar to that of sphere 306 in the implementations described above.

Figure 5B:
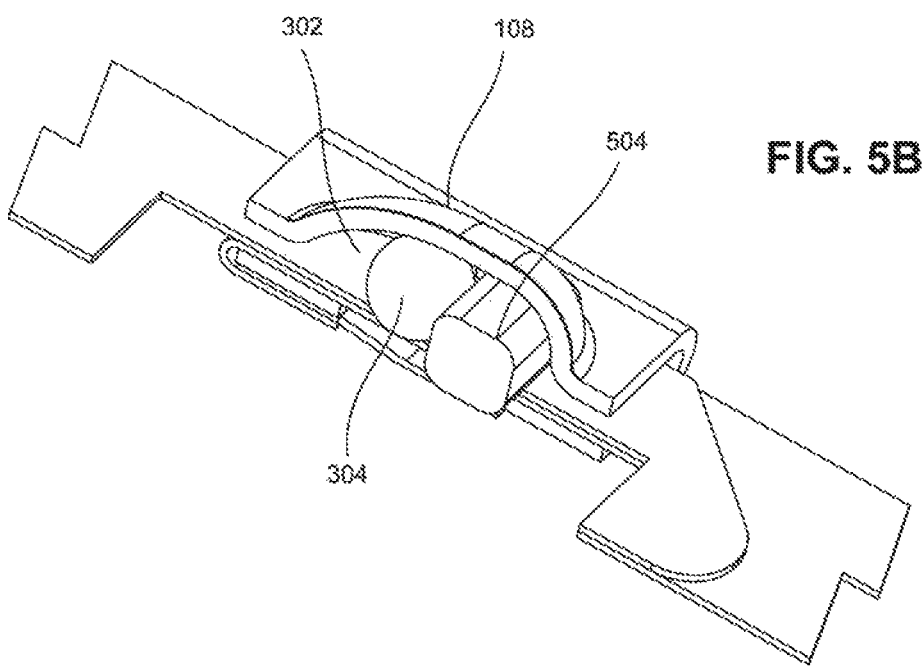
FIG. 5B is an isometric cut-away perspective top/side view of the cable tie according to yet another implementation.

FIG. 5B is an isometric cut-away perspective top/side view of cable tie 100 according to another implementation. In this implementation, cable tie 100 includes, in the place of sphere 306, a block 504. Block 504 may prevent ball bearing 304 from allowing undesirable slippage of band 104 when band 104 is closed around cables/wires, in a manner similar to that described above for sphere 306 (e.g., by occupying a space between ball bearing 304 and stop of housing 108.

Figure 6A:
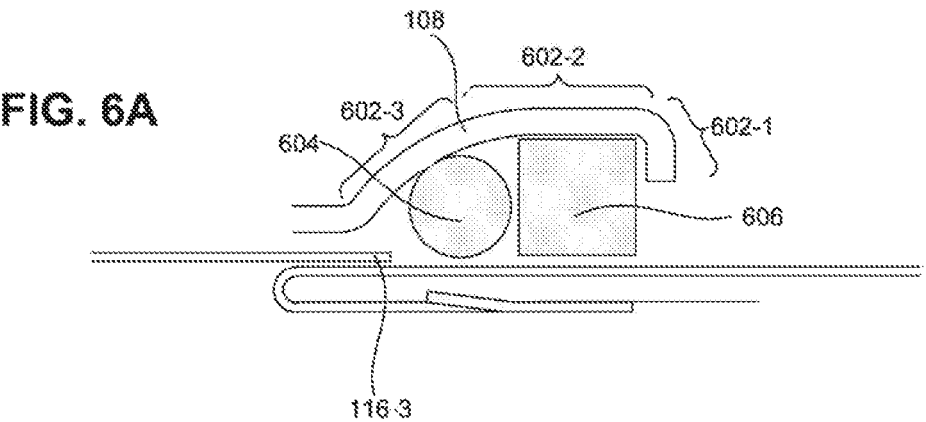
FIGS. 6A-6C are cross-sectional side views of the cable tie according to different implementations.
Figure 6B:
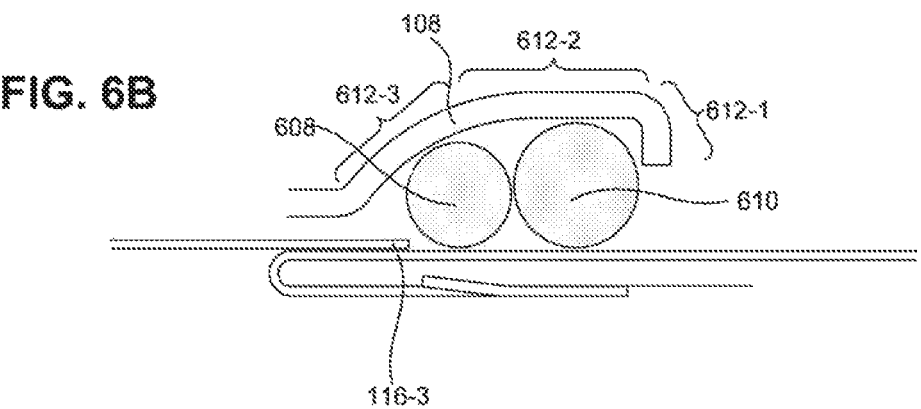
Figure 6C:
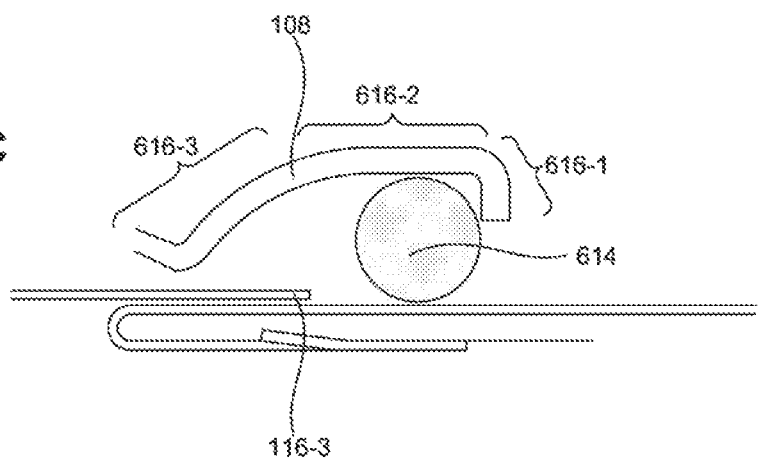
Figure 7:
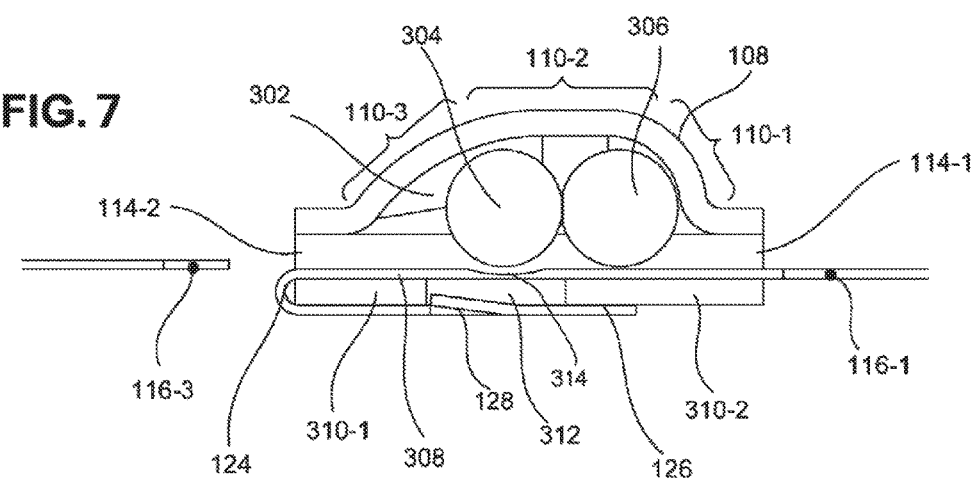
FIG. 7 is a cross-sectional view of the cable tie before an end of the tie is inserted into the locking body of the cable tie and in which a portion of the band includes a dimple.

FIGS. 6A-6C are cross-sectional side views of cable tie 100 according to other, different implementations. FIG. 6A shows the cross-sectional view of cable tie 100 according to one implementation. In this implementation, ball bearing 604, square/cube 606 and side portions 602-1 through 602-3 replace ball bearing 304, sphere 306, and side portions 110-1 through 110-3, respectively, illustrated in FIGS. 4A-4C. Furthermore, each of ball bearing 604, resilient cube 606, side portions 602-1 through 602-3 has a functional role corresponding to the role of bearing 304, sphere 306, and side portions 110-1 through 110-3, respectively. In addition, resilient cube 606 acts as a spring between bearing 604 and side portion 110-1. Cube 606 exerts a pressure on bearing 604 by pushing against side portion 602-1 and bearing 604. This prevents bearing 604 from moving away substantially from portion 602-3, and reducing the force on section 116-3 when section 116-3 is fully inserted in housing 108.

In a typical implementation, resilient cube 606 may be made of stainless steel wire mesh. Depending on the implementation, resilient cube 606 may be replaced by a stainless steel mesh of another shape, such as a round ball, cylinder, rectangular box/prism, etc. In contrast to portions 110 in FIGS. 4A-4C, portions 602 may be longer or shorter—that is, portions 603 may extend to properly accommodate resilient cube 606.

FIG. 6B shows the cross-sectional view of cable tie 100 according to yet another implementation. In this implementation, ball bearing 608 and sphere 610 and side portions 612-1 through 612-3 replace ball bearing 304, sphere 306, and side portions 110-1 through 110-3, respectively, illustrated in FIGS. 4A-4C. Each of ball bearing 608, sphere 610, side portions 612-1 through 612-3 has a functional role similar to the role of bearing 304, sphere 306, and side portions 110-1 through 110-3, respectively. In this implementation, ball bearing 608 is smaller (i.e., has a smaller diameter) than sphere 610 such that ball bearing 608 occupies slack/room in housing 108. Ball bearing 608 and sphere 610 prevents each other from "sloshing" in housing 108 (by occupying the space in housing 108), and thus from reducing the force exerted by bearing 608 and/or sphere 610 on section 116-3 when section 116-3 is fully inserted in housing 108.

Portions 612 may be dimensioned to properly accommodate ball bearing 608 and sphere 610. In some implementations, both ball bearing 608 and sphere 610 may be composed of the same or similar materials (e.g., stainless steel).

FIG. 6C shows the cross-sectional view of cable tie 100 according to still yet another implementation. In this implementation, sphere 614 and replaces ball bearing 304 and sphere 306, and portions 616-1 through 616-3 replace portions 110-1 through 110-3 illustrated in FIGS. 4A-4C. In FIG. 6C, portions 616-1, 612-1, and 616-3 are shaped/cut such that portions 616-1 and/or 616-2 ("housing 108" or buckle) act as backstop against sphere 614. Once inserted into housing 108, section 116-3 acts as a leaf spring on sphere 614 and pushes sphere 614 against portions 616-1 through 616-3. That is, when section 116-3 of cable tie 100 is inserted in housing/buckle 108, sphere 614 is pressed against portions 616 (e.g., especially portions 616-1 and 616-2) by section 116-3. When section 116-3 is being pulled back out of housing 108, sphere 614 is pulled toward portion 616-3, which increases the force applied by section 116-3 against sphere 614. This causes sphere 614 to increase its force on portion 616-3, preventing section 116-3 from being pulled out of housing 108. In this implementation, section 116-3's leaf-spring action against sphere 614 and the shape of portions 616 prevent sphere 614 from moving substantially away from portion 616-3. This causes sphere 614 to maintain constant pressure on section 116-3 and not allow section 116-3 to slip away from within housing 108.

In some implementations, interior section 308 may include a "dimple" or a hole 314. In other implementations, interior portion 308 excludes (i.e., is without) a dimple or a hole. If a hole or a dimple 314 exists on interior section 308, when section 116-3 is fully inserted into housing 108 bearing/sphere (e.g., any one of bearing 304, sphere 306, cylinder 502, cube 606, bearing 608, sphere 610, or sphere 614)) may drive the area (of section 116-3) bearing sits into the hole 314 (on interior section 308) underneath section 116-3. In this way, the dimple or hole on interior position 308 may further stabilize the bearing/sphere, when section 116-3 is locked by the bearing/sphere.

The foregoing description of implementations provides illustration, but is not intended to be exhaustive or to limit the implementations to the precise form disclosed. Modifications and variations are possible in light of the above teachings or may be acquired from practice of the teachings. For example, in some implementations, housing 108 may be shaped differently than that illustrated in FIGS. 1-6C. Furthermore, in some implementations, more than a single sphere 306, cylinder 502, or block 504 may be placed within housing 108 to prevent ball bearing 304 from "sloshing" and allowing slippage of band 104 in the closed configuration. In some implementations, in place of sphere 306 or cylinder 502, or block 504, a spring or spring-like component may be places in housing 108 to prevent slippage. Furthermore, depending on the implementation, a different type of band 104 may be used in place of band 104 (e.g., thicker band, narrower band, etc.). In still other implementations, top surface 118-1 of band 104, the interior surfaces of housing 108 and/or ball bearing 304 may include ridges to increase the friction between top surface 118-1 of band 104, the interior surfaces of housing 108, and/or ball bearing 304.

Although different implementations have been described above, it is expressly understood that it will be apparent to persons skilled in the relevant art that the implementations may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

It should be emphasized that the term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein the article "a" is intended to include one or more items. Further, the phrase "based on" is intended to mean "based, at least in part, on" unless explicitly stated otherwise.

What is claimed is:

1. A cable tie comprising:
a band that extends lengthwise from a first end to a second end;
a housing, affixed near the second end, with a first opening to receive the first end of the band when the first end of the band is brought toward the housing in a loop, wherein the housing comprises:
walls that enclose a space within the housing, the walls having a stop toward the second end of the band, an end portion of the band in proximity to the second end of the band defining a portion of the space and having a cavity;
a first mass in the space; and
a second mass placed in the space and between the first mass and the stop;
wherein when the first end is inserted into the housing, the first end passes under the first mass and the second mass and over the end portion of the band, and exerts a pull on the first mass toward the second mass,
wherein when the first mass is pulled toward the second mass, the second mass acts as a spring between the first mass and the stop and prevents the first mass from hitting the stop,
and wherein the housing and the first mass are sized to, when the first end of the band has been inserted into the housing, drive a portion of the band that is positioned between the first mass and the cavity into a portion of the cavity, and
wherein, after the first end is inserted into the housing and when the first end is being pulled out of the housing, due to a force exerted by the second mass to the first mass and the walls, the first mass squeezes the first end against the bottom of the housing and locks the first end in the housing.

2. The cable tie of claim 1, wherein the first mass includes one of a ball bearing or a cylinder, and wherein the cavity is a hole in the band.

3. The cable tie of claim 1, wherein the second mass includes one of:
a spring, a sphere, a box, a cylinder, or a cube, and wherein the cavity is a dimple in the band.

4. The cable tie of claim 1, wherein the first mass composes rubber or steel.

5. The cable tie of claim 1, wherein the second mass includes one of:
plastic; rubber; sponge-like or spring-like material; stainless steel sponge; or stainless steel wire mesh.

6. The cable tie of claim 1, wherein the walls includes:
a first side wall about one side edge of the band;
a second side wall about the other side edge of the band;
one or more bottom walls covering a bottom surface of the band, and
a top wall, over a top surface of the band, that includes a dome defining the space,
wherein the first side wall, top wall, second side wall, and one or more bottom walls form a contiguous surface wrapped around the band near the second end,
wherein each of the walls extends from a first side facing toward the second end to a second side facing away front the second end of the band, and
wherein, the first, and second side walls are perpendicular to a line parallel to the band, and include the first, opening and a second opening, respectively, formed by the walls wrapped around the band.

7. The cable tie of claim 6, wherein the second end of the band extends from the second opening away from the first opening and folds over the bottom wall to form a flap.

8. The cable tie of claim 7, wherein the bottom wall includes a hole,
wherein the flap includes a tab that bends into the hole, such that when the housing is pulled along a line away from the second end, an edge of the hole abuts the tab to prevent the flap, the second end, and the band from being pulled apart from the housing.

9. The cable tie of claim 8, wherein the dome comprises a front portion toward the second end of the band, a rear portion away the second, end of the band, and a middle portion adjoining the first portion and the second portion,
wherein the space defined by the walls tapers in a direction away from the second end of the band such that as the first mass moves away from the second end, the space becomes narrower to increase a frictional force applied by the first mass on the first end and lock the first end in the housing.

10. The cable tie of claim 1, wherein the first end of the band is tapered.

11. The cable tie of claim 10, wherein the first end is rounded.

12. A cable tie comprising:
a band having a first end and a second end;
a housing, affixed to the band near the second end, with a first opening to receive the first end of the band, wherein the housing comprises:
a first sphere near the first opening and one side of the housing;
a stop mass near a second side of the housing; and
a second sphere between the first sphere and the stop mass, wherein the second sphere has a radius greater than a radius of the first sphere,
wherein when the first end is inserted into the housing, the second sphere prevents the first sphere from moving a first distance occupied by the second sphere, toward the stop mass,
wherein when the first end in the housing is being pulled out of the housing and the first sphere is within a distance from the first side, the first sphere locks the first end in the housing and prevents the first end from being pulled out of the housing; and
wherein the second sphere prevents the first sphere from moving the distance, away from the first side of the housing, at which the first sphere releases the first end.

13. The cable tie of claim 12, wherein the first sphere comprises elastomeric material; or steel.

14. The cable tie of claim 12, wherein the second sphere includes:
   elastomeric material;
   stainless steel sponge;
   stainless steel wire mesh; or
   stainless steel.

15. The cable tie of claim 12, wherein the first end of the band is tapered.

16. The cable tie of claim 11, wherein the band includes steel.

17. A cable tie comprising:
   a band having a first end and a second end;
   a housing, affixed to the band near the second end, with a first opening to receive the first end of the band, wherein the housing comprises:
   walls that enclose a space;
   a first sphere in the space; and
   a stop mass near toward the second end;
   wherein the walls include at least a top wall that tapers the space in a direction away from the second end,
   wherein when the first end is inserted into the housing via the first opening, the first end acts as a leaf spring that pushes the first sphere against the top wall and prevents the first sphere from substantially moving away from the first opening,
   wherein when the first end in the housing is being pulled out of the housing, due to the first sphere being pulled toward the first end in the space tapered by the top wall, the first end acting as the leaf spring applies increased force on the first sphere, causing the first sphere to increase a force that locks the first end in the housing, and
   wherein when the first end remains in the housing, when the first sphere is prevented from substantially moving away from the first opening, the first sphere is prevented from releasing the first end.

18. The cable tie of claim 17, wherein the first end of the band is tapered.

19. The cable tie of claim 17, wherein the band includes steel.

* * * * *